March 29, 1949. G. M. HOLLEY, JR 2,465,535
AIRCRAFT CARBURETOR
Filed March 8, 1945
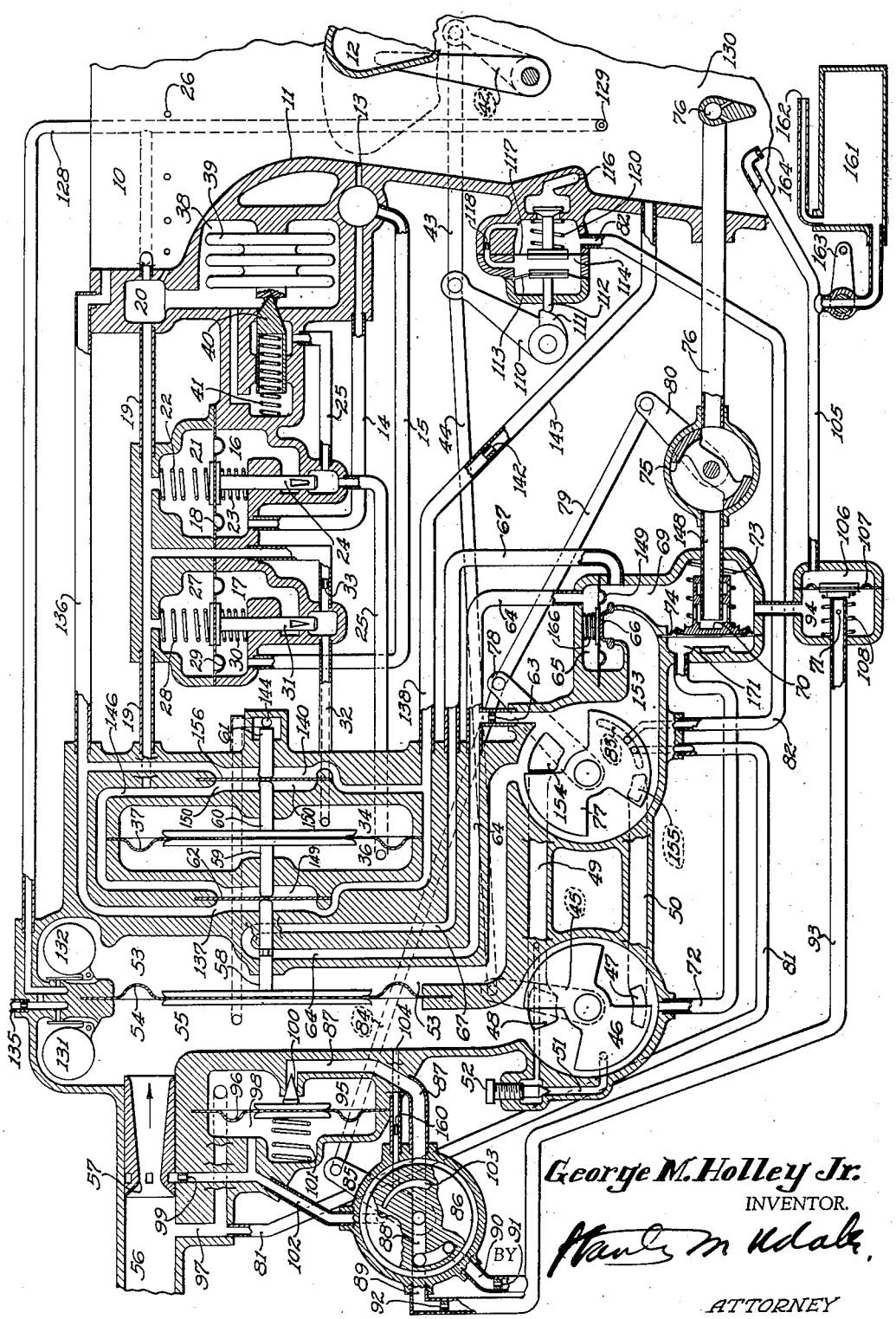
George M. Holley Jr.
INVENTOR.
BY
ATTORNEY Patented Mar. 29, 1949

2,465,535

UNITED STATES PATENT OFFICE 2,465,535

AIRCRAFT CARBURETOR

George M. Holley, Jr., Grosse Pointe, Mich., assignor to George M. Holley and Earl Holley Application March 8, 1945, Serial No. 581,644

7 Claims. (Cl. 261—39)

The object of this invention is to correct the fuel flow in a pressure type aircraft carburetor for an increase in, (a) altitude and (b) airflow. Specifically the object is to do this for a variably Venturi carburetor.

The figure illustrates diagrammatically my invention incorporated as an airplane carburetor.

In the figure, 10 is the air entrance, 11 is the throat of a venturi, 12 is the throttle, which, when moved to the left counter-clockwise, converts the venturi 11 into a variable venturi, 13 is an opening into the throat of the variable venturi 11—12, thus formed, 14 is a passage connecting the orifice 13 with the chamber 16, 15 is a passage parallel to and below the passage 14 and connecting the orifice 13 with the chamber 17, 18 is a diaphragm in the chamber 16, 19 is a passage connecting the annular chamber 20 with a chamber 21 immediately above the diaphragm 18. The annular chamber 20 is in communication with the air entrance 10 through a large number of openings 26 so that the pressure of the air entrance exists in the chamber 21. Springs 22 and 23 support the diaphragm 18, which carries a metering needle 24, which controls the connection between the chamber 16 and a passage 25.

This pressure of the air entering the carburetor also exists in a similar chamber 27, in which there is a similar spring 28 and a diaphragm 29 corresponding to the diaphragm 18, and a spring 30 corresponding to the spring 23 and a metering needle 31 corresponding to the needle 24. This needle 31 forms a restricted communication between the chamber 17 and the passage 32, which communicates through a restriction 33 with the air inlet pressure line 19. The passage 32 communicates with a chamber 34, the passage 25 communicates with a chamber 36, so that a diaphragm 37, which separates the chamber 34 from the chamber 36, is supported on one side by the pressure in the passage 25 and on the other side by the pressure in the pipe 32. The pressure in the chamber 34 is higher than the pressure in the chamber 36; that is to say, the valve 24 is normally opened to such a degree as to admit a good deal of the suction in pipe 14 to the chamber 36, whereas the valve 31 is normally closed and only opens at comparatively high suctions.

The chamber 38 contains a group of altitude bellows 39, which, at altitude, expand and cause the valve 40 to move to the left, compressing the spring 41. The valve 40, which is a balanced valve, then admits atmospheric air to the passage 25, which as stated above is a suction passage so that when the bellows 39 expands due to a lowering of the atmospheric pressure in the entrance 10, the pressure in the pipe 25 rises relative to the pressure in the pipe 32, which is not affected by the bellows 39. At altitude, the influence of the air flow on the diaphragm 37 is thus diminished, and the mixture ratio is thus maintained within the desired limits.

The throttle 12 is rotated by the throttle lever 42, which is connected to the link 43, which in its turn is connected to the link 44 to the lever 45. This lever 45 and its control disc 46 are shown turned clockwise into a partially-open throttle position, and in this position, the valve 46 opens the fuel orifices 47 and 48, which admit metered fuel to passages 49 and 50. The valve 77 in the automatic lean position, as shown, obstructs the flow through the restriction 47 by closing the port 155, but permits that controlled by the opening 48 to flow into the chamber 153 through port 154. This fuel, together with the small quantity of fuel which flows through a bypass 51 past a low speed adjusting needle 52, communicates through 153 with the chamber 53 to the right of a diaphragm 54, which is to the right of a chamber 55, which communicates with a fuel entrance 56 through a fuel venturi 57. Hence, the diaphragm 54 is subjected to the pressure drop at the orifice 48, or at orifices 47—48 when valve 77 is moved to open port 155 to the automatic rich position. The valve rod 58 engages through the diaphragm 62 with the pin 59, which engages through the diaphragm 37, and thus with the pin 60, which pin 60 engages through the small diaphragm 156 with the pin 61, the pressure of which is balanced by the passage 144.

In order that the flow shall be regulated, valve 58 controls the flow of fuel from an orifice 63 through a passage 64, past valve 58 to a passage 67, which communicates with a chamber 69 below the valve 66. The pressure in the passage 64 and in a chamber 65 is equal to the pressure of the fuel in the passage 49, except for the escape of the fuel from the passage 64 to a passage 67, the escape of which is controlled by the valve 58. The pressure thus regulated in the chamber 65 acts on a diaphragm 149. Spring means 166 are used to close the valve 66. When the flow is excessive, that is, when the fuel pressure difference is great acting on the diaphragm 54 as compared with the air pressure difference acting on diaphragm 37, the valves 66 and 58 partly close. The fuel thus metered by valve 66 flows to the outlet 69, in which is located a valve 70 mounted on a diaphragm 74, to the left-hand side of which is a chamber 171 that communicates through the passage 72 with the unmetered fuel in chamber 55.

A spring 73 tends to push the diaphragm 74 to the left and thus opens the valve 70, which allows fuel to flow through the passage 148, past the cut-off valve 75 to the outlet 76.

The mixture control valve 77 is controlled by a lever 78 and link 79, which also controls cut-off valve 75 through the lever 80. When the valve 77 moves clockwise, it moves into the idle cut-off position; when it moves counter-clockwise, it moves to the automatic rich position (A. R.).

Valve 77 is shown in the automatic lean position. When rotated anti-clockwise 45°, fuel is admitted from the variable restriction 47 so that the fuel flow through both 48 and 47 controls the pressure in chamber 53. This is the automatic rich position (A. R.).

Valve 77 and link 79 are connected through the link 84 to the lever 85, which controls the rotation of the valve 86. In the position shown, in which the mixture control valve 77 closes port 155 and thus the valve 46 admits fuel only through the passage 49, the valve 86 provides a path from the pipe 87 to the L-shaped passage 88, which communicates with the passage 89 and also with the passage 90. These passages 89 and 90 communicate through the restriction 91 and through the restriction 92 to the passage 93, and so to the chamber 94, which communicates with the chamber 69, so that any fuel flowing through the passage 93 is added to the fuel flowing past the restriction 48. This fuel flowing through 87 flows from the chamber 95 to the right of the diaphragm 96, which chamber 95 communicates with the fuel entrance 56 through the passage 97.

The chamber 98 to the left of diaphragm 96 communicates with the throat of the venturi 57 through the restricted orifice 99. Valve 100 is carried by the diaphragm 96 and is seated by a compression spring 101 in chamber 98 so that the flow through the venturi 57 must be great enough to compress the spring 101; otherwise, the valve 100 will not open, so that the valve 100 only opens at high air flows and when the fuel flow is correspondingly high.

A passage 102 connects with the restricted orifice 99, and in the position shown is inoperative. When the lever 85 is moved counter-clockwise into the automatic rich position (A. R.), an opening 103 in 86 allows the fuel flowing through 99 to flow through 103 from a restricted passage 104. The jet numbered 160, located in the passage 104 is an important restriction in the fuel metering system. Restriction 99 is inserted only to make the jet 150 of small enough size. Jet 99 can be omitted if the suction holes in the Venturi throat 57 are of the proper size and are held to close limits in production.

The passage 104 communicates with the unmetered fuel in the chamber 55 so that when the lever 85 is moved counter-clockwise to the automatic rich position (A. R.), a certain amount of fuel flows from the chamber 55 through the passage 104 through the restricted orifice 160 to the passage 102, and so the pressure in the chamber 98 rises. Hence, the valve 100 closes slightly, and the combined effect of rotating the lever 85 counter-clockwise is to open valve 77 so as to admit fuel from port 47 and by rotating valve 86 to cut off the fuel flowing through 89 and restrict the fuel to the capacity of the restriction 91. In addition, the operating pressure difference which causes the valve 100 to move to the left to open is no longer as powerful because of the back bleed from 104 through 103 up 102 through 99 to the throat of venturi 57.

When anti-detonating liquid is required to obtain military output, the usual practice is to cut off the fuel added by the power enrichment venturi 57, valve 100 and passages 87, 89, 90 and 93. The pressure of this anti-detonation liquid, water for example, is applied through a passage 105 to a chamber 106, containing a diaphragm 107. This compresses a spring 108 contained in chamber 94. The diaphragm 107 is adapted to close the end of the passage 93 so that when anti-detonating fluid is added, no fuel flows through passage 93, except through a small side hole 71. The anti-detonating liquid is contained in tank 161. The pipe 162 is connected with some convenient source of pressure, for example, the fuel entrance 56. Valve 163, when opened, causes anti-detonating fluid to issue from the nozzle 164.

Acceleration

When the throttle 12 is opened rapidly, the lever 110, connected to the throttle 12 and lever 45 by links 43 and 44, is rotated clockwise and supplies pressure through the cam 111 to the finger 112, which moves the diaphragm 113 to the right. This compresses the liquid in the chamber 114, which unseats the valve 115 and allows accelerating fuel to discharge through the discharge orifice 116 on the engine side of the throttle 12. Valve 115 is carried by a diaphragm 117, which forms the opposite wall of the chamber formed by the two diaphragms 113 and 117. A restriction 118 determines the time the valve 115 remains open. The compression spring 120 also determines the time the valve 115 remains open. The accelerating fuel is supplied from the pipes 82 and 81, which are connected with the passage 97.

Passages 81 and 82 are connected through the passage 83 in the valve 77. When the valve 77 is moved 45° into the idle cut-off position, the passage 83 moves clockwise and leaves the two passages 81 and 82 cut off from each other. The object of this is that when the attempt is made to stop the engine by placing the valve in the idle cut-off position, the attempt has failed. The instructions are that when the throttle 12, which is in the position to give approximately 1050 revolutions per minute, is opened, thus flooding the engine with air and rendering the mixture non-explosive, the accelerating device shown will automatically function unless the pipe 81 was cut off from the pipe 82, and it is most undesirable when stopping an engine for the accelerating device to discharge fuel. Moreover, as the engine slows down, the pressure in the pipe 81 automatically falls, which also is apt to cause the untimely discharge of fuel from the accelerating device.

To sum up, the wobble pump can be used as a primer when the valve 77 is in the automatic rich position (A. R.). It can also be used when in the automatic lean position, but it cannot be used when in the idle cut-off position.

The unmetered fuel in the chamber 55 and the chamber 53 containing metered fuel are both vented either back to the tank, or as shown through the passage 128 through the restriction 129 to the outlet 130 of the venturi 13—12. The vapor is thus removed from the upper part of the chambers 53—55. Floats 131—132 have integral with them valves which control outlet orifices.

The passage 135 is the alternative escape back to the tank.

Passage 136 communicates with the air entrance 10 and with the chamber 137 to the left of diaphragm 62 and also with the drain passage 138. Passage 136 also communicates with the chamber 140 to the right of diaphragm 156, and chamber 140 also communicates with the drain passage 138. The restriction 142 in the drain passage 138 communicates with the suction passage 143, which communicates with the outlet passage 130, down which any liquid escaping by the valve 58 or past the rod 61 is drawn into the engine. A passage 144 connects the chamber 145 to the right of the end of the pin 61 and communicates with the unmetered fuel in chamber 55. The passage 19 communicates with the passage 146, which communicates with the chamber 150 on the left-hand side of the diaphragm 156. The passage 146 also communicates with the right-hand side of diaphragm 62, that is, with chamber 149, so that the diaphragms 62 and 156 have the same pressure on each side.

Operation

Assume that the engine is running with the controls as shown in the cruising lean position, but with the throttle 12 not fully open.

The fuel flow from the entrance 56 past the diaphragm 54 through the restriction 48 will control the pressure difference on the opposite sides of the diaphragm 54 as the right-hand side of 54 communicates with the downstream side of restriction 48. The valve 77 will completely close the opening 155 so that the flow through 47 is blocked when the controls are in the position shown.

The flow through the air entrance creates a pressure difference between the entrance openings 26 and the opening 13 in the throat. This pressure difference, assuming that the plane is flying at sea level and the valve 40 is closed, is transmitted through the pipe 14 past the valve 24 through passage 25 to chamber 36 on the left-hand side of the diaphragm 37.

The atmospheric pressure is transmitted through the passage 19 through the restriction 33, passage 32 to the chamber 34 on the right-hand side of the diaphragm 37. Assume that the air flow is out of step with the fuel flow, as happens when the throttle is partly closed, so that an excessive amount of fuel is flowing. Then the pilot valve 58 is moved to the right by the pressure drop through restriction 48 acting on diaphragm 54, and the flow through passage 64 ceases. Then the pressure in chamber 65 rises and valve 66 moves to restrict the flow past the valve 66. This restricted flow causes the valve 58 to move to the left to reopen. This increases the flow past this valve 58 through passage 64 and this causes a drop in pressure, which permits the valve 66 to open more so as to increase fuel flow and thus reestablish equilibrium.

The pins 58—59, 60 and 61 are separated by the diaphragms 62, 37 and 156, and any leakage past the pin 61 or 58 will not flow past the pins 59 and 60, but will flow past the restriction 142 in the pipe 138—143.

As the flow of air increases, the velocity exceeds the critical and the valve 31 is moved down and thus lowers the pressure in the pipe 32 and thus reduces the fuel flow. The air is an elastic medium so that as the velocity reaches the critical, the depression is greater than the increase in the weight of air taken in would justify so that without the valve 31, the mixture would get rich. The pressure difference across the diaphragm 37 being balanced against the pressure difference across the diaphragm 54 controls fuel flow.

As the plane ascends, the barometric element 39 expands and air flows from the opening 26 past the valve 40 to the passage 25 to the chamber 36 and thus reduces the pressure difference across the diaphragm 37. The same weight of air per second causes a greater drop in any venturi, the less the density, that is, the greater the altitude. Hence, the valve 40 corrects for altitude in conjunction with valve 24. The variable opening past the valve 31 in conjunction with the fixed restriction 33 prevents the mixture becoming abnormally rich when the airflow becomes very great. The variable opening past the valve 24 in conjunction with the opening around the valve 40 prevents the mixture from becoming rich at high altitude. At any given altitude the opening around the valve 40 is fixed although this opening varies at every altitude, hence, at any given altitude the degree of compensation for altitude is obtained by the variable opening around the valve 24 and the fixed opening around the valve 40. The pressure drop across the valve 40 is determined by the amount of air drawn past the valve 24. The amount of this air is controlled by the valve 40. At high velocity of airflow into the engine past the throttle valve 12 causes the valve 24 to open and the increased air flow past the valve 24 causes an increase in the pressure drop in the pipe 25. This is the pressure drop past the valve 40 and this pressure drop is determined by the barometric element 39 and is transmitted to the low pressure side of the diaphragm 37. An increase in this suction causes an increase in fuel flow. A decrease in fuel flow is caused by an increase in air flow past the valve 31 as the suction in the pipe 32 is transmitted to the pressure side of the diaphragm 37.

What I claim is:

1. A fuel supply system for an engine comprising an air intake, a variable streamlined restriction in said intake, a fuel supply passage, a supply of fuel under pressure, a variable fuel restriction therein, means for simultaneously opening and closing said variable air restriction and said variable fuel restriction, the variable fuel restriction being designed to be approximately half open when the variable streamlined restriction is half open and to fully open only when the variable streamlined restriction is fully open, automatic fuel control means for maintaining a predetermined mixture ratio including two diaphragms, one responsive to the drop in pressure due to fuel flow through said fuel restriction, the other responsive to the drop in air pressure in the throat of said variable restriction, a pilot valve engaging with and operated by both diaphragms acting in opposition to each other, a fuel metering valve in said fuel passage controlled by said pilot and located in series with and downstream from said variable fuel restriction, a fuel bypass around said metering valve leading past said pilot valve, a restriction in said bypass located upstream from said pilot valve, a diaphragm engaging with said metering valve, spring means adapted to close said metering valve, the change in pressure in said bypass responsive to the movement of said pilot valve being adapted when applied to said diaphragm to open and close said metering valve whereby the drop in pressure across said variable fuel restriction is adjusted so as to equal the drop in pressure at the throat of said variable air restriction.

2. A carburetor having an air entrance, an air venturi therein, a source of fuel under pressure, a fuel entrance leading to a fuel metering restriction, a first flexible diaphragm responsive to the pressure drop across said metering restriction, a second flexible diaphragm engaging with and opposing the movement of the first diaphragm and responsive to the pressure drop in the throat of the said air venturi, a pilot valve adapted to be operated by said two diaphragms, a fuel pressure regulating valve located downstream from the said fuel metering restriction, fluid pressure operating means for said pressure regulating valve controlled by said pilot valve, altitude correcting means for the pressure drop in the throat of the said air venturi comprising a passage leading from the throat of the said air venturi to the suction side of said second diaphragm, a valve in said passage a third diaphragm responsive to the pressure drop in said venturi and to yielding means operating in opposition to said pressure drop connected to said last mentioned valve, an atmospheric air bleed leading into said passage between the valve and the suction side of said second diaphragm, a valve in said bleed, barometric means for opening said last mentioned valve at high altitude, air flow correcting means for the pressure drop in the throat of said air venturi comprising a passage connecting the pressure side of said second diaphragm with the atmospheric pressure in the air entrance, a restriction therein of a fixed size, a venturi suction bleed into said passage located between said restriction and the pressure side of said second diaphragm, a valve in said bleed, a fourth diaphragm connected to said last mentioned valve and also responsive to the pressure drop in said venturi and to yielding means opposing said pressure drop.

3. A carburetor having an air entrance, an air venturi therein, a source of fuel under pressure, a fuel entrance leading to a fuel metering restriction, a first flexible diaphragm responsive to the pressure drop across said metering restriction, a second flexible diaphragm engaging with and opposing the movement of the first diaphragm and responsive to the pressure drop in the throat of the said air venturi, means for restricting the flow of fuel through said fuel metering restriction controlled by the movement of said first and second diaphragms, altitude correcting means for the pressure drop in the throat of the said air venturi comprising a passage leading from the throat of the said venturi to the suction side of said second diaphragm, a valve in said passage a third diaphragm responsive to the pressure drop in said venturi and to yielding means operating in opposition to said pressure drop connected to said last mentioned valve, an atmospheric air bleed leading into said passage between the valve and the suction side of said second diaphragm, a valve in said bleed, barometric means for opening said last mentioned valve at high altitude, air flow correcting means for the pressure drop in the throat of said air venturi comprising a passage connecting the pressure side of said second diaphragm with the atmospheric pressure in the air entrance, a restriction therein of a fixed size, a venturi suction bleed into said passage located between said restriction and the pressure side of said second diaphragm, a valve in said bleed, a fourth diaphragm connected to said last mentioned valve and also responsive to the pressure drop in said venturi and to yielding means opposing said pressure drop.

4. A device as set forth in claim 2 in which the fluid pressure operating means for the pressure regulating valve is derived from the fuel supply downstream from said fuel metering restriction.

5. A carburetor having an air entrance, variable streamlined air restriction forming a venturi therein, a source of fuel under pressure, a fuel entrance leading to a variable fuel metering restriction operatively connected to said streamlined air restriction, a first flexible diaphragm responsive to the pressure drop across said variable metering restriction, a second flexible diaphragm engaging with and opposing the movement of the first diaphragm and responsive to the pressure drop in the throat of the said air venturi, a pilot valve adapted to be operated by said two diaphragms, a fuel pressure regulating valve located downstream from the said fuel metering restriction, fluid pressure operating means for said pressure regulating valve controlled by said pilot valve, altitude correcting means for the pressure drop in the throat of the said air venturi comprising a passage leading from the throat of the said venturi to the suction side of said second diaphragm, a valve in said passage a third diaphragm being responsive to the pressure drop in said venturi and to yielding means operating in opposition to said pressure drop connected to said last mentioned valve, an atmospheric air bleed leading into said passage located between the valve and the suction side of said second diaphragm, a valve in said bleed, barometric means for opening said last mentioned valve at high altitude, airflow correcting means for the pressure drop in the throat of said air venturi comprising a passage connecting the pressure side of said second diaphragm with the atmospheric pressure in the air entrance, a restriction therein of a fixed size, a venturi suction bleed into said passage located between said restriction and the pressure side of said second diaphragm, a valve in said bleed, a fourth diaphragm connected to said last mentioned valve and also responsive to the pressure drop in said venturi and to yielding means opposing said pressure drop.

6. A device as set forth in claim 5 in which the fluid pressure operating means for the pressure regulating valve is derived from the fuel supply downstream from said fuel metering restriction.

7. A carburetor having an air entrance, variable streamlined air valve forming a venturi therein, a source of fuel under pressure, a valve forming a variable fuel metering restriction, a fuel entrance leading to said variable fuel metering valve, mechanical linkage connected to said valve operatively connected to said streamlined air valve, a first flexible diaphragm responsive to the pressure drop across said variable metering restriction, a second flexible diaphragm engaging with and opposing the movement of the first diaphragm and responsive to the pressure drop in the throat of the said air venturi, a pilot valve operatively connected to said first and second diaphragms, a control valve in series with said first mentioned fuel valve and controlled by said pilot valve, altitude correcting means for the pressure drop in the throat of the said air venturi comprising a passage leading from the throat of the said venturi to the suction side of said second diaphragm, a valve in said passage a third diaphragm being responsive to the pressure drop in said venturi and to yielding means operating in opposition to said pressure drop connected to said last mentioned valve, an atmospheric air bleed leading into said passage located between the valve and the suction side of said second diaphragm, a valve in said bleed barometric means for opening said last mentioned valve at high altitude, air flow correcting means for the pressure drop in the throat of said air venturi comprising a passage connecting the pressure side of said second diaphragm with the atmospheric pressure in the air entrance, a restriction therein of a fixed size, a Venturi suction bleed into said passage located between said restriction and the pressure side of said second diaphragm, a valve in said bleed, a fourth diaphragm connected to said last mentioned valve and also responsive to the pressure drop in said venturi and to yielding means opposing said pressure drop.

GEORGE M. HOLLEY, Jr.

REFERENCES CITED

The following references are of record in the file of this patent:

UNITED STATES PATENTS

| Number | Name | Date |
|---|---|---|
| Re. 22,254 | Chandler | Jan. 26, 1943 |
| 2,224,472 | Chandler | Dec. 10, 1940 |
| 2,361,227 | Mock | Oct. 24, 1944 |
| 2,361,228 | Mock | Oct. 24, 1944 |
| 2,367,499 | Holley | Jan. 16, 1945 |
| 2,372,306 | Adair | Mar. 27, 1945 |
| 2,372,356 | Chandler | Mar. 27, 1945 |